M. VANDER WEIDE.
Submarine Lantern.
No. 81,231. Patented Aug. 18, 1868.
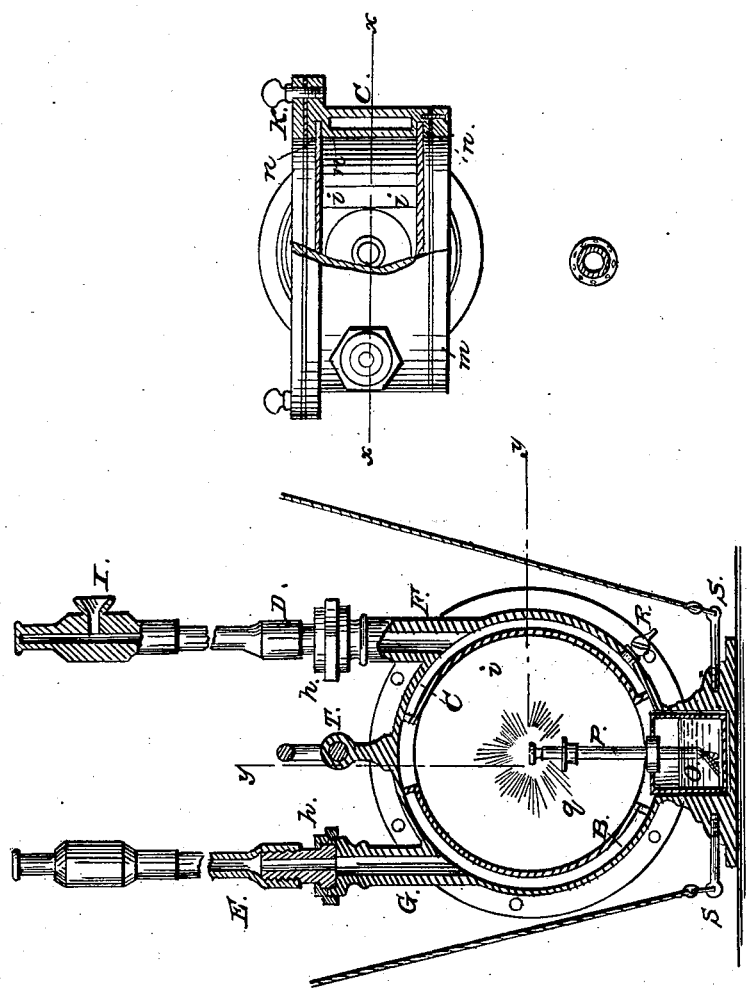

United States Patent Office.

MICHEL VANDER WEIDE, OF ST. PETERSBURGH, RUSSIA, ASSIGNOR TO CASSIUS M. CLAY.

Letters Patent No. 81,231, dated August 18, 1868.

IMPROVEMENT IN SUBMARINE LANTERNS.

*The Schedule referred to in these Letters Patent and making part of the same.*

TO ALL WHOM IT MAY CONCERN:

Be it known that I, MICHEL VANDER WEIDE, of St. Petersburgh, Russia, have invented a new and useful Improvement in Submarine Lantern; and I do hereby declare that the following is a full, clear, and exact description thereof, which will enable those skilled in the art to make and use the same, reference being had to the accompanying drawings, forming part of this specification.

This invention relates to a new apparatus for submarine lighting, for the use of divers and other purposes, whereby the difficulties of submarine exploration are greatly diminished.

And the invention consists in so constructing and arranging the parts of the lantern, that gas is generated for supplying the flame, and provision is made for supplying the flame with air and for discharging the products of combustion and condensed air and gases formed in the lantern, and in protecting the flame and reservoir from water when the lantern is submerged, as will be hereinafter more fully described.

Figure 1 is a vertical section of the lantern through the line $x$ $x$ of fig. 2, showing its construction and manner of operation.

Figure 2 is a broken or sectional top view of the lantern, showing the air-passage in the shell, and the manner in which the glass or transparent sides of the lantern are fastened in the shell and leakage prevented, the section being through the line $y$ $y$ of fig. 1.

Similar letters of reference indicate corresponding parts.

A represents the shell, which is a longitudinal section of a hollow cylinder with channels or passages therein, for the entrance of air, and for the discharge of incombustible gases or condensed air.

These channels are marked, respectively, B and C.

Both are connected with flexible tubes, which may be of any desired length, but which must extend above the surface of the water when the lantern is submerged.

D is the tube through which air is introduced, and is connected with the channel C.

This channel is open at its upper end and closed at its lower end, as seen in the drawing.

E is the tube through which the condensed air or incombustible gases are discharged.

This tube is connected with the channel B, which is open at the bottom and closed at the top, as seen.

The flexible tubes D and E are attached to the rigid tubes F and G by screw-connections, as seen at $h$ $h$.

I is a funnel in the air-tube D, through which air may be introduced by bellows before the lantern is submerged.

J is a flange on one side of the shell, to which an annular packing-ring $k$ is attached by any suitable number of screws.

The green lines in fig. 2, marked $i$ $i$, represent the glass sides of the lantern.

$m$ is a packing-ring on the other side of the lantern from the flange J.

Both the rings $k$ and $m$ confine rubber or other elastic packing in contact with the glass, as seen at $n$ $n$.

O is the reservoir for the liquid.

The liquid used is of a volatile nature, being composed of alcohol and spirits of turpentine mixed in proper proportions.

P is the burner, which may contain a capillary, if necessary, to raise the liquid in the burner a certain distance by capillary attraction.

By elevating the temperature of the liquid or burner slightly, by burning alcohol around it, the liquid is vaporized, and a gas is formed which is discharged through the small orifices seen near the end of the burner at $q$. A regular wick-tube may be used, so as to consume any burning-fluid without vaporizing it if found more convenient.

R is a tube closed by a cock for the discharge of air, when it may be necessary to discharge it.

S S are rings attached to bars at the base of the lantern, to which cords are attached for suspending the lantern or lowering and raising it.

T represents a knob for attaching a ring, by which the driver carries or handles the lantern.

I claim as new, and desire to secure by Letters Patent—

The submarine lantern having the semicircular channels B C, formed concentrically in the body of the cylinder, the former being closed at the top and opening into the cylinder at the bottom, and the latter closed at the bottom and opening into the cylinder at the top, said chambers communicating, respectively, with the supply and exhaust-tubes F G upon each side of the burner, as herein described, for the purpose specified.

The above specification of my invention signed by me, this 15th day of April, A. D. 1868.

*Colonel-Lieutenant* MICHEL VANDER WEIDE. [L. S.]

Witnesses:
    C. M. CLAY,
    GEORGE POMUTZ.